US 6,581,158 B1

(12) United States Patent
Plourde

(10) Patent No.: US 6,581,158 B1
(45) Date of Patent: Jun. 17, 2003

(54) METHOD FOR THE RESETTING OF A MICROCONTROLLER BASED UPON A LEVEL OF A SUPPLY VOLTAGE

(75) Inventor: Olivier Plourde, Aix en Provence (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/476,870

(22) Filed: Jan. 3, 2000

(30) Foreign Application Priority Data

Jan. 5, 1999 (FR) .............................. 99 00037

(51) Int. Cl.[7] ............................................... G06F 9/24
(52) U.S. Cl. ......................................................... 713/1
(58) Field of Search ....................... 713/1, 330; 331/49

(56) References Cited

U.S. PATENT DOCUMENTS

| | | | | |
|---|---|---|---|---|
| 3,913,028 A | * | 10/1975 | Bosselaers | 331/1 A |
| 5,081,625 A | * | 1/1992 | Rhee et al. | 714/55 |
| 5,369,377 A | * | 11/1994 | Benhamida | 331/49 |
| 5,513,358 A | * | 4/1996 | Lundberg et al. | 713/330 |
| 5,544,092 A | | 8/1996 | Gunther et al. | 395/800 |
| 5,606,293 A | * | 2/1997 | Matsui et al. | 331/74 |
| 5,889,442 A | * | 3/1999 | Ouellette et al. | 331/173 |
| 6,205,547 B1 | * | 3/2001 | Davis | 713/1 |
| 6,359,809 B1 | * | 3/2002 | Tedrow et al. | 365/185.29 |
| 6,370,643 B1 | * | 4/2002 | Kubo | 713/1 |

FOREIGN PATENT DOCUMENTS

| | | | | |
|---|---|---|---|---|
| EP | 0 532 790 A1 | 3/1993 | | G06F/15/78 |
| EP | 0 606 806 A1 | 7/1997 | | G06F/9/44 |
| JP | 05268017 | 10/1993 | | H03K/5/135 |

* cited by examiner

Primary Examiner—Thomas Lee
Assistant Examiner—Eric Chang
(74) Attorney, Agent, or Firm—Lisa K. Jorgenson; Allen, Dyer, Doppelt, Milbrath & Gilchrist, P.A.

(57) ABSTRACT

A method for resetting a microcontroller includes a reset sequence to make the microcontroller go from a power-off mode to a run mode when the level of a supply voltage goes over a threshold. The reset sequence includes reading an option word stored in a programmable memory by the user for configuring internal circuits of the microcontroller, particularly circuits that are effected by the reset sequence.

33 Claims, 2 Drawing Sheets

| CFC | OSC2 | OSC1 | OSC0 | LVD1 | LVD0 | WDG1 | WDG0 |

FIGURE 5

| OSCILLATOR SELECTION | OSC2 | OSC1 | OSC0 |
|---|---|---|---|
| EXTERNAL CLOCK | 1 | 1 | 1 |
| RC INTERNAL | 1 | 1 | 0 |
| RE EXTERNAL | 1 | 0 | 1 |
| | 1 | 0 | 0 |
| RESONATOR 1 | 0 | 1 | 1 |
| RESONATOR 2 | 0 | 1 | 0 |
| RESONATOR 3 | 0 | 0 | 1 |
| RESONATOR 4 | 0 | 0 | 0 |

FIGURE 6

| INITIALIZATION THRESHOLD | LVD1 | LVD0 |
|---|---|---|
| NONE | 1 | 1 |
| HIGH | 1 | 0 |
| AVERAGE | 0 | 1 |
| LOW | 0 | 0 |

FIGURE 7

METHOD FOR THE RESETTING OF A MICROCONTROLLER BASED UPON A LEVEL OF A SUPPLY VOLTAGE

FIELD OF THE INVENTION

The present invention relates to microcontrollers, and, more particularly, to a method for resetting a microcontroller including a reset sequence to make the microcontroller go from a power-off mode to a run mode when the level of a supply voltage goes over a threshold.

BACKGROUND OF THE INVENTION

A microcontroller is an electronic circuit including a central processor unit or core, an EPROM or EEPROM memory, a main oscillator, one or more analog-digital converters, input-output interfaces and possibly peripheral circuits. The advantage of a microcontroller as compared with a microprocessor is that the microcontroller can be used in an autonomous way. That is, practically no external circuitry is needed for their operation. This is why their use is very widespread in relatively straightforward applications, such as in small electronic items.

Resetting the microcontroller is done in a power-on reset operation. It can also be prompted by an external reset signal, or by a reset signal coming from an internal circuit of the microcontroller called a watchdog circuit. The microcontroller can also be reset by a signal from a low voltage detector circuit which detects an excessively low level of supply voltage.

The power-off mode is particularly important when detecting an excessively low level of supply voltage, wherein the level of the supply voltage is not stable. In the power-off mode, all the internal circuits of the microcontroller are inhibited such that these circuits do not function. An exception is for a reset sequence dedicated to the management of the reset sequence. Thus, the drawbacks that could result from an operation of the microcontroller with an excessively low supply voltage are avoided. Example drawbacks are corruption or loss of data, poor sequencing of instructions due to defective clock signals, etc.

The microcontroller does not go into the run mode from a power-off mode except when the level of the supply voltage at a power supply input has become greater than the above-mentioned threshold. Between these two modes, the microcontroller is said to be in a reset mode. The run mode is the normal mode of operation in which the program loaded by the user into the memory of the microcontroller is performed. This program is known as the user program.

The reset sequence starts when the level of supply voltage becomes greater than the above-mentioned threshold. It includes a time-lag phase during which the main oscillator of the microcontroller is released, so that it starts oscillating and becomes stabilized at its nominal oscillating frequency. The duration of this phase is fixed and corresponds to a time necessary to enable this stabilization. During this phase, the reset sequence and the main oscillator are the only internal circuits of the microcontroller that are not inhibited or no longer inhibited.

The reset sequence furthermore includes a step or phase for loading the address bus with the address of the memory, i.e., fetch vector, at which the start of the user program is located. This step ends the reset sequence and the microcontroller goes into the run mode.

It is necessary to provide the user with the possibility of configuring certain circuits of the microcontroller to adapt them to the needs of the application. This operation of configuration must not be mistaken for the loading of the user program into the memory of the microcontroller. The configuring operation is designed to activate or deactivate certain functions of the microcontroller, or to customize them. It is therefore a hardware configuration as opposed to software for loading the user program. Furthermore, unlike loading of the user program, this configuring operation is renewed at each resetting. For example, it may be desirable to enable the user to activate or deactivate the low voltage detector circuit and/or to choose the level of the threshold below which it generates a resetting signal.

In the prior art, this is sometimes obtained by reading an option word that is stored in the memory of the microcontroller. This step operates in the run mode. The values of the bits of this option word that are read position the dedicated registers of the microcontroller. The option word may be read statistically, i.e., permanently by the microcontroller. The option word may also be read dynamically by a specific instruction that the user must place at the beginning of the user program, for example.

However, this method is not applied to the configuring of the circuits of the microcontroller that operate in the reset sequence, such as the reset sequence and the main oscillator. This is because it was not thought possible to apply this method before the microcontroller was in the run mode. During the reset sequence, all the internal circuits of the microcontroller are inhibited except for the reset sequencer itself. During the time-lag phase, all the internal circuits of the microcontroller are inhibited except for this resetting sequencer as well as the main oscillator.

It may be desirable to enable the user to choose the value of the resetting threshold. The user may prefer to choose this value himself based upon the particular application. The higher the resetting threshold, the more reliable is the operation of the microcontroller. A high resetting threshold ensures that the microcontroller is in a run mode only when the supply voltage is very adequate for the proper operation of its internal circuits. Conversely, the higher the resetting threshold the greater the time during which the microcontroller may remain in a power-off mode.

In the prior art, one approach known for obtaining a resetting threshold that can be configured by the user is in the use of a circuit external to the microcontroller, which is typically an analog circuit that the user is free to adapt to his needs. External configuration circuits of this kind are nevertheless penalizing inasmuch as they make it more complicated and more costly to install the microcontroller in an intended application.

SUMMARY OF THE INVENTION

The present invention seeks to overcome the above described drawbacks of the prior art. The invention provides a method for the resetting of a microcontroller wherein the reset sequence comprises the following steps: a) reading an option word stored in a programmable memory by the user for the configuration of the internal circuits of the microcontroller; b) a time-lag phase for the starting and stabilizing of the main oscillator of the microcontroller; and c) loading of the address bus with the starting address of a user program stored in the memory of the microcontroller. The internal circuits of the microcontroller thus operate in the reset sequence, and can be configured by the user by programming a specified option word in the memory of the microcontroller.

Other characteristics of the invention include the following. The step a) starts when the level of the supply voltage becomes greater than a configuration threshold. The configuration threshold is not configurable. The configuration comprises the specification of the value of a resetting threshold higher than the configuration threshold. The step b) starts when the level of the supply voltage becomes greater than this resetting threshold but not before the end of step a).

Additional characteristics include the following. The step b) starts at the end of step a). The step a) is performed at the rate of a low frequency back-up oscillator. The configuration comprises the selection of a source for the main oscillator of the microcontroller from among, in particular, one or more external resonators having different frequencies, an external RC circuit, an internal RC circuit or an external clock. The configuration comprises the activation or non-activation of a clock filtering circuit. The option word is stored in the memory of the microcontroller.

BRIEF DESCRIPTION OF THE DRAWINGS

Other features and advantages of the invention shall appear from the following detailed description. This description is given purely by way of an illustration, with reference to the appended drawings, of which:

FIGS. 5, 6 and 7 are respectfully a diagram and tables showing the contents and function of an option word according to the present invention.

DETAILED DESCRIPTION OF THE PREFERRED EMBODIMENTS

Figure 1:
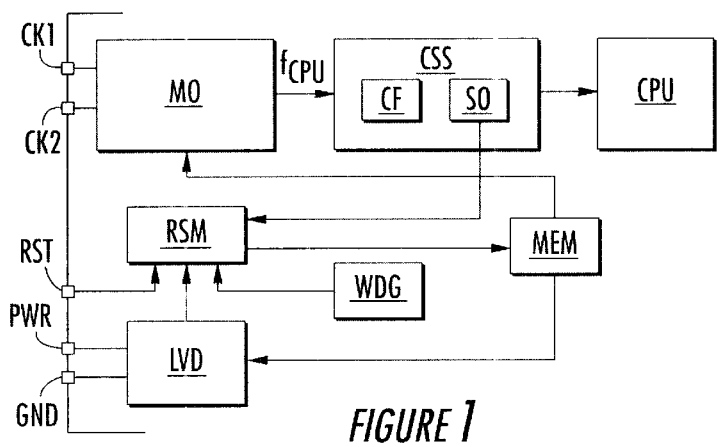
FIG. 1 shows a simplified drawing of a microcontroller for implementation of the method according to the present invention.

FIG. 1 shows a simplified diagram of a microcontroller implementing the method according to the present invention. This microcontroller comprises a central processing unit CPU as well as an EPROM or EEPROM type memory MEM in which is stored a user program. It furthermore comprises a main oscillator circuit MO providing the main oscillator function for the microcontroller. An oscillator of this kind generates a clock signal $f_{CPU}$ used by the CPU in the run mode. The rated frequency of this signal may be 8 MHZ, for example.

According to the invention, it is possible to configure the main oscillator circuit MO by selecting a particular source of oscillation for the main oscillator among several possible sources. In particular, the source of oscillation may be an external (quartz) resonator with a specified frequency, an external RC circuit, an internal RC circuit or an external oscillator.

Figure 2A:
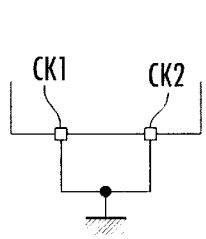
FIG. 2a–2d show the connection of two input pins of the microcontroller illustrated in FIG. 1.
Figure 2D:
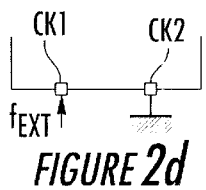
Figure 2C:
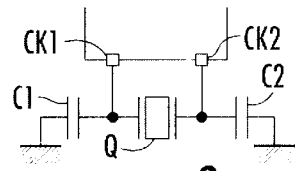
Figure 2B:
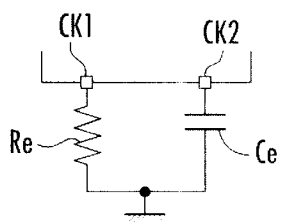

FIGS. 2a to 2d show the connection of two input pins CK1 and CK2 of the microcontroller that are to be used in each of the above cases. The main oscillator circuit MO is connected to these pins CK1 and CK2 (FIG. 1). FIG. 2a corresponds to the case of an internal RC circuit, wherein the pins CK1 and CK2 are connected to ground. FIG. 2b corresponds to the case of an external RC circuit. The pin CK1 is connected to ground through a resistor Re, and the pin CK2 is connected to ground through a capacitor Ce. The value of Re and Ce determine the frequency of the oscillator.

FIG. 2c corresponds to a case of an external resonator. A resonator or quartz crystal Q is connected between the pins CK1 and CK2. The pin CK1 is connected to ground through a capacitor C1, and the pin CK2 is connected to ground through a capacitor C2. The resonant frequency of the quartz crystal determines the frequency of the oscillator. According to the invention, it is possible to configure the main oscillator circuit MO by selecting several different frequencies according to different values of the resonant frequency of the quartz crystal positioned between the pins CK1 and CK2. FIG. 2d corresponds to the case of an external oscillator. Pin CK1 receives the clock signal $f_{ext}$ generated by this external oscillator, and pin CK2 is connected to ground. An external oscillator of this kind may be of any known type, such as a resonator, a Wien bridge, an RC or other type of oscillator.

Returning to FIG. 1, the clock signal $f_{CPU}$ is applied to the input of a clock filtering circuit CSS. The function of this circuit is first to eliminate the pulses of the signal $f_{CPU}$ that occur at a frequency higher than a first determined threshold. Second, its function is also to give the CPU unit a low frequency signal delivered by a back-up oscillator SO when the clock signal $f_{CPU}$ is absent or has a frequency below a second threshold which is lower than the first threshold. In other words, the clock filtering circuit CSS enables the permanent delivery to the CPU in the run mode of a clock signal whose frequency remains within a specific range between the above-mentioned second and first thresholds.

The microcontroller furthermore comprises a circuit LVD for the detection of the level of the voltage $V_{DD}$. A circuit of this kind is connected to the pins PWR and GND of the microcontroller, which respectively receives this supply voltage $V_{DD}$ and ground. This is an essentially analog circuit comprising several detection thresholds, and generates different signals as a function of the level of $V_{DD}$ with respect to its detection thresholds. The microcontroller furthermore comprises a watchdog circuit whose function is to generate a resetting signal in the event of a blocking of the microcontroller. A circuit of this kind is readily known by one skilled in the art.

The microcontroller furthermore comprises a circuit RSM or resetting sequencer that manages the resetting of the microcontroller. This circuit may be activated in three different ways. A first way of activation is on the reception of a negative pulse at a pin RST of the microcontroller to which it is connected. This is the case of a resetting of the microcontroller prompted by an external resetting signal. A second way is on the reception of a resetting signal generated by the detection circuit LVD when the level of the supply voltage $V_{DD}$ becomes lower than a predetermined threshold. A third way of activation is on the reception of a resetting signal generated by the watchdog circuit WDG.

Figure 3:
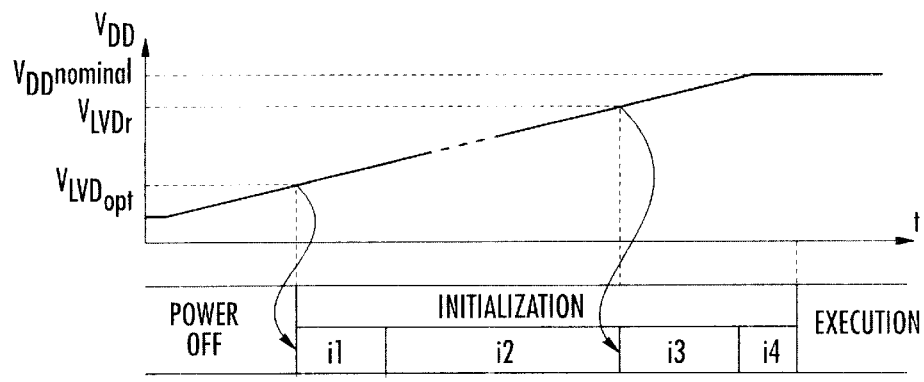
FIG. 3 shows a curve of the supply voltage as a function of time according to the present invention.
Figure 4:
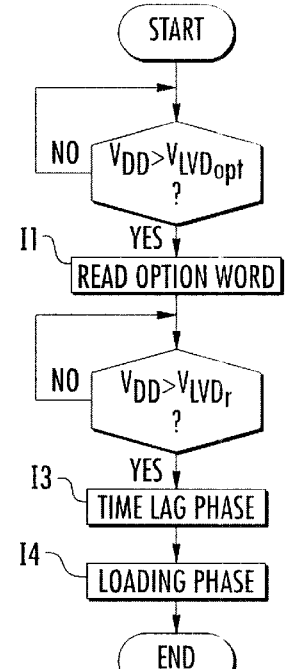
FIG. 4 is a flow chart illustrating the reset sequence according to the present invention.

Operation of the sequencer RSM according to the method of the invention shall now be described with reference to FIG. 3 and FIG. 4. FIG. 4 shows a flow chart showing operation of the reset sequence. FIG. 3 shows the curve of the voltage $V_{DD}$ as a function of time. This voltage takes a certain period of time to go from a zero value to its nominal value $V_{DDnominal}$ which, in one example, is equal to 5 V. This time is naturally very short when reset by an external resetting signal or by the watchdog circuit WDG. This time is slightly more in the case of the powering-on the microcontroller. In this case, the build-up of $V_{DD}$ to its nominal value is delayed by the capacitive load of the pin PWR. This time may furthermore become non-negligible in the case of a resetting by the circuit LVD because of the uncontrolled development of the level of the supply voltage $V_{DD}$.

As long as the level $V_{DD}$ is below a first threshold $V_{LVDopp}$, the microcontroller is kept in the power-off mode.

All its logic circuits are inhibited. Only the circuit LVD, which is essentially an analog circuit is in operation. As soon as the level of $V_{DD}$ becomes greater than the level $V_{LVDopt}$, the sequencer RSM is activated by the circuit LVD. The operation then enters the proper resetting sequence. This is symbolized by the step START in FIG. 4.

This sequence begins with a step I1 for reading at least one option word in a memory of the microcontroller. The step I1 starts when the level of the supply voltage $V_{DD}$ becomes greater than the configuration threshold $V_{LVDopt}$, namely at the beginning of the reset sequence. For reasons of clarity, the comparison step $V_{DD} > V_{LVDopt}$? has been included in the flow chart of FIG. 4 between START and the step I1 corresponding to the step of reading the option word or words.

The memory in which the option word or words are stored may be a dedicated memory, such as a small EPROM or EEPROM memory array designed for this purpose, for example. However, in one preferred embodiment (FIG. 1), this memory is the memory of the microcontroller, i.e., the one in which the user program is stored. When an 8 Kb memory is organized in 8-bit words, the option word is preferably an 8-bit word.

The values of the bits of the option word that are read during this step are used to position internal registers of the microcontroller to obtain a hardware configuration of a portion of the internal circuits. While eight bits are not enough to configure all the internal circuits of the microcontroller, it is possible to use several option words. The contents of an option word will be seen again with reference to FIG. 5.

The option word is write-accessible in only one particular mode of operation of the microcontroller, called a programming mode. This is also the mode that enables loading of the user program in the memory of the microcontroller. Normally, it is programmed only once by the user in the same way as the user program. However, if the memory is an EEPROM, there is nothing to prevent it from being subsequently modified.

The configuration threshold $V_{LVDopt}$ is not configurable, namely its value is fixed and cannot be modified in any way. It is specified by appropriate circuitry in the circuit LVD. In one example, it is equal to 2.7 V. This value is high enough for an accurate operation of the sequencer RSM.

Inasmuch as the main oscillator MO of the microcontroller is inhibited during the step I1, the operation for reading the option word is advantageously done at the rate of the clock signal delivered by the back-up oscillator SO of the microcontroller. Since this oscillator delivers a low frequency clock signal, such as in the range of 225 kHz, the read operation is performed efficiently despite the possible low level of the supply voltage $V_{DD}$. The reading step I1 requires six clock cycles of the back-up oscillator.

The configuration of the internal circuits of the microcontroller, especially those circuits that come into play in the remaining part of the reset sequence, but not necessarily these circuits only, is done at the end of the reading step I1 under the control of the sequencer RSM.

This configuration may include the specification of the value of a particular threshold of the circuit LVD, called a resetting threshold $V_{LVDr}$, which is greater than the configuration threshold $V_{LVDopt}$. The term specification is understood to mean both the fact of determining whether or not this threshold will be taken into account in the LVD circuit, and giving it a specified value. This aspect of the configuration will be taken up in the description with reference to FIG. 7.

Should a resetting threshold be taken into account in the LVD circuit, a time-lag step I3 for the starting and stabilizing the main oscillator MO of the microcontroller starts when the level of the supply voltage $V_{DD}$ becomes greater than the resetting threshold $V_{LVDr}$, but not before the end of the read step I1. Inasmuch as this may occur well after the end of the read step I1 only, FIG. 3 shows a waiting step I2 between the read step I1 and the time-lag step I3. The comparison step $V_{DD} > V_{LVDr}$? is done during this waiting step I2.

If no resetting threshold $V_{LVDr}$ has been taken into account in the circuit LVD, then the step I3 starts at the end of step I1 based upon the configuration of the circuit LVD. In other words, there is no waiting step I2. The configuration threshold also fulfils the function of the resetting threshold, except that the step I3 starts only after the end of the step I1, and not as soon as the level of $V_{DD}$ has become greater than the configuration threshold.

The configuration may also include the selection of an oscillation source for the main oscillator MO of a microcontroller from among one or more external resonators of different frequencies, an external RC circuit, an internal RC circuit or an external clock. The main oscillator MO, once it is configured by the selection of a determined source of oscillations, starts at the beginning of the time-lag step I3. The oscillator is stabilized at its nominal frequency $f_{CPU}$ between 4 and 16 MHZ during this step. In practice, this step has a specified duration. This duration is, for example, equal to 4096 clock cycles of the main oscillator ($f_{CPU}$) enabling it to be controlled with a 12-bit counter.

After the end of the time-lag step I3, the reset sequence comprises a final step I4 for the loading of the address bus of the microcontroller with the starting address of a user program stored in the memory of the microcontroller. This loading step I4 ends the reset sequence, as indicated by the END of the flow chart illustrated in FIG. 4.

The configuration step I3 and loading step I4 are identical to the corresponding step of the reset sequences known in the prior art. The configuration may finally include the activation or non-activation of the clock filtering circuit CSS. This safety function is not always desired by the users. Should the circuit CSS be deactivated, the signal $f_{CPU}$ generated by the main oscillator MO is directly transmitted to the input of the central processing unit CPU.

FIG. 5 shows the contents of an 8-bit option word. These bits are described as follows. Starting from the most significant bit, are a bit CFC that is equal to 0 to activate the clock filtering circuit CSS, and is equal to 1 to deactivate it. The conjugate values of the three bits OSC2, OSC1 and OSC0 determine the selected source of oscillations for the main oscillator MO in accordance with the table of FIG. 6. The conjugate values of the two bits LVD1 and LVD0 determine the level of the resetting threshold $V_{LVDr}$ in accordance with the table of FIG. 7. If these two bits are equal to 1, no resetting threshold is taken into account by the detection circuit LVD. The two bits WDG1 and WDG0 are designed for the configuration of the watchdog circuit WDG and will not be described in greater detail since this circuit does not operate in the reset sequence.

The invention also provides a microcontroller comprising a central processing unit CPU and a memory MEM, as well as resetting means RSM and LVD to make the microcontroller go from a power-off mode to a run mode when the level of a supply voltage $V_{DD}$ becomes greater than a threshold. This microcontroller implements a resetting method as described above.

That which is claimed is:

1. A method for resetting a microcontroller having a reset sequence to make the microcontroller go from a power-off mode to a run mode when a level of a supply voltage exceeds a first threshold, the reset sequence comprising the steps of:
   a) reading an option word stored in a programmable memory by a user and configuring internal circuits of the microcontroller based on the option word;
   b) after step a) starting and stabilizing a main oscillator of the microcontroller after a time-lag phase; and
   c) after step b) loading an address bus with a starting address of a user program stored in the programmable memory of the microcontroller.

2. A method according to claim 1, wherein step a) starts when the level of the supply voltage becomes greater than the first threshold.

3. A method according to claim 2, wherein the first threshold is not adjustable.

4. A method according to claim 2, wherein a second threshold is greater than the first threshold; and wherein step b) starts when the level of the supply voltage becomes higher than the second threshold.

5. A method according to claim 2, wherein step b) starts at the end of step a).

6. A method according to claim 1, wherein step a) is performed at a frequency corresponding to a low frequency back-up oscillator having a frequency less than a frequency of the main oscillator.

7. A method according to claim 1, further comprising the step of selecting as a source for the main oscillator from one or more of external resonators having different frequencies, an external RC circuit, an internal RC circuit, and an external clock.

8. A method according to claim 1, further comprising the step of filtering a signal generated by the main oscillator.

9. A method according to claim 1, further comprising the step of storing the option word in the programmable memory.

10. A method for resetting a microcontroller comprising the steps of:
    a) detecting when a level of a supply voltage goes over a first threshold;
    b) after step a) reading an option word and configuring internal circuits of the microcontroller based on the option word;
    c) after step b) detecting when the level of the supply voltage goes over a second threshold that is greater than the first threshold;
    d) after step c) starting and stabilizing a main oscillator of the microcontroller after a time-lag phase; and
    e) after step d) loading an address bus with a starting address of a user program for making the microcontroller go from a power-off mode to a run mode.

11. A method according to claim 10, wherein the first threshold is not adjustable.

12. A method according to claim 10, wherein step d) starts at the end of step c).

13. A method according to claim 10, wherein step b) is performed at a frequency corresponding to a low frequency back-up oscillator having a frequency less than a frequency of the main oscillator.

14. A method according to claim 10, further comprising the step of selecting as a source for the main oscillator from one or more of external resonators having different frequencies, an external RC circuit, an internal RC circuit, and an external clock.

15. A method according to claim 10, further comprising the step of filtering a signal generated by the main oscillator.

16. A method according to claim 10, further comprising the step of storing the option word in a programmable memory.

17. A method according to claim 16, further comprising the step of storing the starting address of the user program in the programmable memory.

18. A microcontroller comprising:
    a central processing unit (CPU);
    a main oscillator connected to said CPU;
    a memory connected to said main oscillator; and
    a reset circuit connected to said memory for making the microcontroller go from a power-off mode to a run mode when a level of a supply voltage goes over a first threshold by the steps of:
       a) reading an option word stored in said memory and configuring internal circuits of the microcontroller based on the option word,
       b) after step a) starting and stabilizing said main oscillator after a time-lag phase, and
       c) after step b) loading an address bus connected to said CPU with a starting address of a user program stored in said memory.

19. A microcontroller according to claim 18, further comprising a detection circuit connected to said reset circuit for detecting the level of the supply voltage.

20. A microcontroller according to claim 18, wherein said memory is programmable.

21. A microcontroller according to claim 18, wherein the first threshold is not adjustable.

22. A microcontroller according to claim 18, wherein a second threshold is greater than the first threshold; and wherein step b) is started when the level of the supply voltage becomes higher than the second threshold.

23. A microcontroller according to claim 18, further comprising a filter between said main oscillator and said CPU.

24. A microcontroller according to claim 23, wherein said filter comprises a backup oscillator, and wherein execution of step a) is performed at a frequency corresponding to said backup oscillator.

25. A microcontroller according to claim 18, wherein said main oscillator comprises a plurality of connections for connecting to a source from one or more of external resonators having different frequencies, an external RC circuit, an internal RC circuit, and an external clock.

26. A microcontroller comprising:
    a central processing unit (CPU);
    a main oscillator connected to said CPU;
    a memory connected to said main oscillator; and
    a reset circuit connected to said memory for making the microcontroller go from a power-off mode to a run mode by the steps of:
       a) detecting when a level of a supply voltage goes over a first threshold,
       b) after step a) reading an option word and configuring internal circuits of the microcontroller based on the option word,
       c) after step b) detecting when the level of the supply voltage goes over a second threshold that is greater than the first threshold,
       d) after step c) starting and stabilizing said main oscillator after a time-lag phase, and
       e) after step d) loading an address bus connected to said CPU with a starting address of a user program for making the microcontroller go from the power-off mode to the run mode.

27. A microcontroller according to claim 26, further comprising a detection circuit connected to said reset circuit for detecting the level of the supply voltage.

28. A microcontroller according to claim 26, wherein said memory is programmable.

29. A microcontroller according to claim 26, wherein the first threshold is not adjustable.

30. A microcontroller according to claim 26, wherein a second threshold is greater than the first threshold; and wherein step b) is started when the level of the supply voltage becomes higher than the second threshold.

31. A microcontroller according to claim 26, further comprising a filter between said main oscillator and said CPU.

32. A microcontroller according to claim 31, wherein said filter comprises a backup oscillator, and wherein execution of step a) is performed at a frequency corresponding to said backup oscillator.

33. A microcontroller according to claim 26, wherein said main oscillator comprises a plurality of connections for connecting to a source from one or more of external resonators having different frequencies, an external RC circuit, an internal RC circuit, and an external clock.

* * * * *